US007597941B2

(12) United States Patent
Sunkara et al.

(10) Patent No.: US 7,597,941 B2
(45) Date of Patent: Oct. 6, 2009

(54) TUBULAR CARBON NANO/MICRO STRUCTURES AND METHOD OF MAKING SAME

(75) Inventors: Mahendra Kumar Sunkara, Louisville, KY (US); Gopinath Bhimarasetti, Hillsboro, OR (US)

(73) Assignee: University of Louisville Research Foundation, Inc., Louisville, KY (US)

( * ) Notice: Subject to any disclaimer, the term of this patent is extended or adjusted under 35 U.S.C. 154(b) by 0 days.

(21) Appl. No.: 10/937,738

(22) Filed: Sep. 9, 2004

(65) Prior Publication Data

US 2005/0238567 A1 Oct. 27, 2005

Related U.S. Application Data

(60) Provisional application No. 60/501,533, filed on Sep. 9, 2003.

(51) Int. Cl.
*H05H 1/24* (2006.01)
*D01F 9/12* (2006.01)
*B32B 9/00* (2006.01)

(52) U.S. Cl. ............... 427/576; 427/569; 427/575; 423/447.1; 423/447.3; 423/447.5; 423/449.8; 428/367

(58) Field of Classification Search .......... 427/569, 427/576; 423/447.1, 447.3, 447.5, 449.8; 428/367

See application file for complete search history.

(56) References Cited

U.S. PATENT DOCUMENTS

| 6,333,016 | B1* | 12/2001 | Resasco et al. | 423/447.3 |
| 6,764,874 | B1* | 7/2004 | Zhang et al. | 438/99 |
| 6,858,197 | B1* | 2/2005 | Delzeit | 423/447.3 |
| 2002/0076553 | A1* | 6/2002 | Sharma et al. | 428/367 |
| 2006/0240974 | A1* | 10/2006 | Hongo | 502/60 |

OTHER PUBLICATIONS

Qin et al, "Growing carbon nanotubes by microwave plasma-enhanced chemical vapor deposition," Jun. 29, 1998, Applied Physics Letters, vol. 72. No. 26, pp. 3437-3439.*

(Continued)

*Primary Examiner*—Timothy H Meeks
*Assistant Examiner*—Cachet I Sellman
(74) *Attorney, Agent, or Firm*—Stites & Harbison PLLC; Robert C. Yang; Mandy Wilson Decker

(57) ABSTRACT

A method of synthesizing and controlling the internal diameters, conical angles, and morphology of tubular carbon nano/micro structures. Different morphologies can be synthesized included but not limited to cones, straight tubes, nozzles, cone-on-tube (funnels), tube-on-cone, cone-tube-cone, n-staged structures, multijunctioned tubes, Y-junctions, dumbbell (pinched morphology) and capsules. The process is based on changing the wetting behavior of a low melting metals such as gallium, indium, and aluminum with carbon using a growth environment of different gas phase chemistries. The described carbon tubular morphologies can be synthesized using any kind of gas phase excitation such as, but not limited to, microwave excitation, hot filament excitation, thermal excitation and Radio Frequency (RF) excitations. The depositions area is only limited by the substrate area in the equipment used and not limited by the process. The internal diameters of the carbon tubular structures can be varied from a few nm to as high as about 20 microns. The wall thickness is about 10-20 nm. The carbon tubular structures can be formed open on both ends are directly applicable to micro-fluidics. Gallium required for the growth of the carbon tubes can be supplied either as a thin film on the substrate or could be supplied through the gas phase with different precursors such as Tri-methyl gallium. Seamless Y-junctions with no internal obstructions can be synthesized without the need of templates. Multi-channeled junctions can also be synthesized without any internal obstructions. Gallium that partially fills the carbon structures can be removed from the tubes by simple heating in vacuum at temperature above 600°.

20 Claims, 8 Drawing Sheets

OTHER PUBLICATIONS

Su et al., "Lattice-Oriented Growth of Single Walled Carbon Nanotubes," Jul. 20, 2000, Journal of Physical Chemistry B, vol. 104.*

Bhimarasetti et al. Morphological Control of Tapered and Multi-Junctioned Carbon Tubular Structures. Aug. 25, 2003. Advanced Materials. vol. 14, No. 19. pp. 1629-1632.*

* cited by examiner

US 7,597,941 B2

TUBULAR CARBON NANO/MICRO STRUCTURES AND METHOD OF MAKING SAME

This application claims priority from U.S. Provisional application Ser. No. 60/501,553 filed on Sep. 9, 2003.

This application is part of a government project. The research leading to this invention was supported NSF through Contract/Grant No. 9876259. The United States Government retains certain rights in this invention.

BACKGROUND OF THE INVENTION

1. Field of the Invention

A method to synthesize and control the morphology of tubular carbon nano structures. Different morphologies of tubular carbon such as tubes, cones, nozzles, funnels, and multijunctioned tubes, can be synthesized reliably. The technique is based on the wetting behavior of gallium with carbon in different gas phase growth environments.

2. Description of the Prior Art

The myriad structural manifestations and their material properties have made carbon nanostructures very interesting not only for potential applications but also for understanding carbon at the atomic scale. Several different nano-sized structures of carbon have been investigated intensely. A few of these include single and multi-walled nano tubes, helical nanotubes, cones, horns, conical crystals, micro-trees and nanopipettes. The synthesis methods for carbon tubes with larger inner diameters are of interest for applications in micro-/nano-fluidics. Libera et al. reported hydrothermal synthesis of graphite tubes with higher inner diameters ranging from 70-1300 nm using nickel as a catalyst. They also found that the tubes encapsulated "hydrothermal fluid" and process gases during the growth with a fraction of the tubes also containing inner obstructions reminiscent of bamboo styling due to nickel catalyst. Bando et al., synthesized gallium filled straight nanotubes using thermal evaporation of gallium oxide mixed with carbon. Similar results were obtained with thermal evaporation of gallium nitride powder in the presence of acetylene Pan et al. These gallium filled straight carbon tubes have been projected as nano thermometers.

Nanostructures find unique applications in electronics, optoelectronics, and catalysis due to their high surface to volume ratio, enhanced material characteristics due to quantum confinement effects and the high fraction of chemically similar surface sites. Functionalization of these nanostructures can only be achieved and become useful through the synthesis of bulk quantities of defined structures with controlled composition, crystallinity and morphology. Nanostructures of carbon will be of particular interest for these applications.

Up until now, only advanced tools such as electron beam lithography were able to assemble nanostructures, by selectively transferring nano-building blocks, or by surfactant induced mesoscopic organization, and redox templating synthesis of inorganic metal wires. However, these tools are still too slow and cost-prohibitive for the assembly of large-area nanopipettes of nanomaterials for device fabrication.

The teachings of the above-noted prior art demonstrated an uncontrolled growth process yielding only straight tubes with small inner diameters of only about 30-200 nm. Control of the morphology of the carbon nano tubes was not taught by these known references.

SUMMARY OF THE INVENTION

The present invention provides a method for synthesis of new types of morphologies for carbon tubular structures based on varying inner diameter. It is shown that these new morphologies, tapered tubes, nozzles, funnels, Y-junctions and multi-junctioned tubular structures, can be tuned through gas phase chemistry. These morphologies exhibit thin walls (10-20 nm) and very larger internal diameters (up to 20 µm) suitable for micro-/nano-fluidic, drug delivery and nanoelectronic applications. A mechanism governing the controlled growth of these new morphologies of carbon nanostructures is described herein.

The present invention comprises a technique to synthesize and control and fine tune the morphology of tubular carbon nano structures. The present invention also provides a means to control the inner and outer diameter of the tubes providing means of controlling the wall thickness of same. Different morphologies of tubular carbon such as tubes, cones, nozzles, funnels, and multijunctioned tubes, can be synthesized reliably. The technique is based on the wetting behavior of gallium with carbon in different gas phase growth environments.

Typically, the growth of multi-walled carbon nanotubes is accomplished using transition metal catalysts such as nickel and iron. During growth, the catalyst particle size and the growth interface do not change thus maintaining a constant tube diameter. Controlling the morphology of the carbon nanostuctures is of interest. Merkulov et al., used nickel catalyst and relative concentrations of $C_2H_2/NH_3$ to synthesize "cylinder-on-cone" morphology. Again, the internal diameter of the structure is constant and determined by the nickel catalyst size. In the instant invention, the contact angle of gallium meniscus with carbon in the absence or presence of oxygen or nitrogen is dependant on temperature. This variation of gallium meniscus shape with the growing 'tube' allows for tapering or curving of the growing carbon structures. In the presence of oxygen or nitrogen, gallium wets carbon, thus forming a flatter meniscus during growth. Based on this behavior of gallium various morphologies of carbon nanostructures can be successfully controlled and synthesized.

More particularly, the present invention provides a method of synthesizing and controlling the internal diameters, conical angles, and morphology of tubular carbon nano/micro structures. Different morphologies can be synthesized included but not limited to cones, straight tubes, nozzles, cone-on-tube (funnels), tube-on-cone, cone-tube-cone, n-staged structures, multijunctioned tubes, Y-junctions, dumbbell (pinched morphology) and capsules. The process is based on changing the wetting behavior of a low melting metals such as gallium, indium, and aluminum with carbon using a growth environment of different gas phase chemistries. The described carbon tubular morphologies can be synthesized using any kind of gas phase excitation such as, but not limited to, microwave excitation, hot filament excitation, thermal excitation and Radio Frequency (RF) excitations. The deposition area is only limited by the substrate area in the equipment used and not limited by the process. The internal diameters of the carbon tubular structures can be varied from a few nm to as high as about 25 microns. The wall thickness is about 10-20 nm. The carbon tubular structures can be formed open on both ends and are directly applicable to micro-fluidics. Gallium required for the growth of the carbon tubes can be supplied either as a thin film on the substrate or could be supplied through the gas phase with different precursors such as Tri-methyl gallium. Seamless Y-junctions with no internal obstructions can be synthesized without the need of templates. Multi-channeled junctions can also be synthesized without any internal obstructions. Gallium that partially fills the carbon structures can be removed from the tubes by simple heating in vacuum at temperature about 600°-700° C..

The carbon tubular structures of the present invention have use as nano fluid delivery systems, absorption and percolation medium, electronic devices such as junction diodes made of multi-junctioned tubular structures, lithium exchange medium in batteries, ink delivery systems for printer cartridges, and hollow funnels or nano-crucibles for metal alloy production permitting the containment and handling of very small amounts of material such as for combinatorial synthesis, and for micro-reactors for combinatorial synthesis.

Furthermore, the tubular carbon nano/micro structures of the present invention having tunable internal diameters, and conical angles can provide flow channels in microfluidic devices, flow distribution channels in microfluidic devices, control valves/throttle valves in microfluidic devices, medium for Lithium intercalation electrodes, pico-liter dispensers, templates for synthesis of similar morphologies of other materials systems, micro-reactors, and nano test tubes to study fluid flow behavior and materials behavior at various length scales.

It is an object of the present invention to form tubular carbon nano/micro structures with tunable internal diameters.

It is an object of the present invention to form tubular carbon nano/micro structure with tunable conical angles.

It is an object of the present invention to form tubular carbon nano/micro structure and describe the strategy for controlling the diameter and morphology of same.

It is an object of the present invention to form nano tubular structures whereby the morphology can be controlled and fine tuned as needed.

It is an object of the present invention to form nano tubular structures whereby larger inner diameter tubes can be produced with control over the inner diameters.

It is an object of the present invention to provide a method of synthesizing different nano tubular morphologies in a controlled fashion, like cones, nozzles, straight tube, funnels, and multi-junctioned tubular structures.

It is an object of the present invention to control the diameter of the interior tubular structure.

It is an object of the present invention to control the wall thickness of portions of a nano structure.

It is an object of the present invention to form a nano structure that is tubular in structure.

It is an object of the present invention to produce nano structures which can be constricted by use of bimetallic strips or electrodes in electrical connection with an energy source in order to squeeze material out of the nano structure.

It is an object of the present invention to provide a means of diameter distribution through the shape and size of single nanotube structures or a plurality of nanostructures in close proximity one to another.

It is an object of the present invention to provide nanotube structures whereby the conical angle can be changed during the formation of the nanotube structures.

It is an object of the present invention to provide nanotube structures whereby the diameter can be changed during the formation of the nanotube structures.

It is an object of the present invention to produce nano tubular structures having a constant wall thickness of from about 15 to about 20 nm with the inner diameter comprising up to several microns providing large diameter carbon tubes.

It is an object of the present invention to prepare nano tubular structures that are open ended on both ends so that they are directly applicable to nano-micro-fluidics.

It is an object of the present invention to form nano tubular structures which can be grown on very large areas, as great or greater than a two inch square area.

It is an object of the present invention to form nano tubular structures having open ended and hollow Y-junctions with seamless joining at the junction cab making them directly applicable to nano/micro fluidics.

It is an object of the present invention to form nano tubular structures whereby no special templating is necessary for producing Y-junctions and the synthesized Y-junction are defect free at the junction.

It is an object of the present invention to have the ability to tune the diameters from a few nm to as high as 25 microns, and control the morphologies and conical angles of these new class of the carbon tubular structures.

In summary, the present invention describes a method to engineer, in a controlled manner, the morphology of carbon nanostructures, i.e., alter the shape of the growing carbon tubular structures in-situ by changing the gas phase chemistry. Seamless Y-junctions with no internal obstructions can be reliably synthesized. It is also shown that one can produce junctions within one tube that lead to interconnected tubes or funnels or channel junctions. These multi-junctioned structures could find applications in nano-electronic devices such as junction diodes. The synthesis of these nanostructures has implications in numerous materials science fields. One of these is the potential of using these large diameter tubular structures with no internal obstructions at channel junctions in micro-fluidic applications as well as nanostructures percolation media. The hollow funnels can also serve as "nanocrucibles" for metal alloy production, which permit the containment and handling of very small amounts of metals. The latter would be of interest to the field of combinatorial synthesis, for instance, as potential micro/nano arrays for solid-state synthesis.

Other objects, features, and advantages of the invention will be apparent with the following detailed description taken in conjunction with the accompanying drawings showing a preferred embodiment of the invention.

BRIEF DESCRIPTION OF THE DRAWINGS

A better understanding of the present invention will be had upon reference to the following description in conjunction with the accompanying drawings in which like numerals refer to like parts throughout the several views and wherein.

DESCRIPTION OF THE PREFERRED EMBODIMENT

As illustrated in the figures, the present invention provides a technique to synthesize and control the morphology of tubular carbon nano structures including but not limited to cones, tubes, cone-on-tube (funnels), tube-on-cone, cone-tube-cone, n-staged structures (n>1), Y-junctions, multi-channeled junctions dumbbells and capsules.

Figure 16:
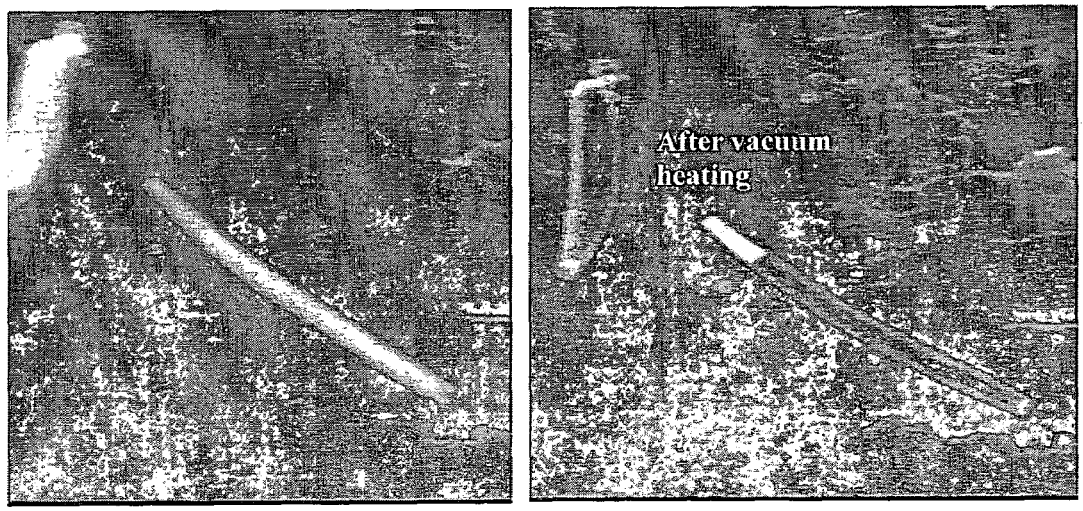
FIG. 16 is a microphotograph showing removal of gallium from the carbon tubes by simply heating in a vacuum.

The technique is based on our ability to change the wetting behavior of low melting metals such as gallium, indium and aluminum with carbon using different gas phase chemistries. For example, the contact angle between gallium and carbon can be reduced in the presence of activated oxygen or nitrogen. In the instant invention, the synthesis technique utilized a procedure of dosing the feed gases with oxygen or nitrogen or both at different stages of the growth to control and fine tune the internal diameters and morphologies of the carbon tubular structures. The gallium can be removed from the capsule by simply heating as shown in FIG. 16.

In addition to graphite, other substrates which do not react with low melting metals such as silicon can be used for the substrate.

Synthesis Procedure

Figure 15:
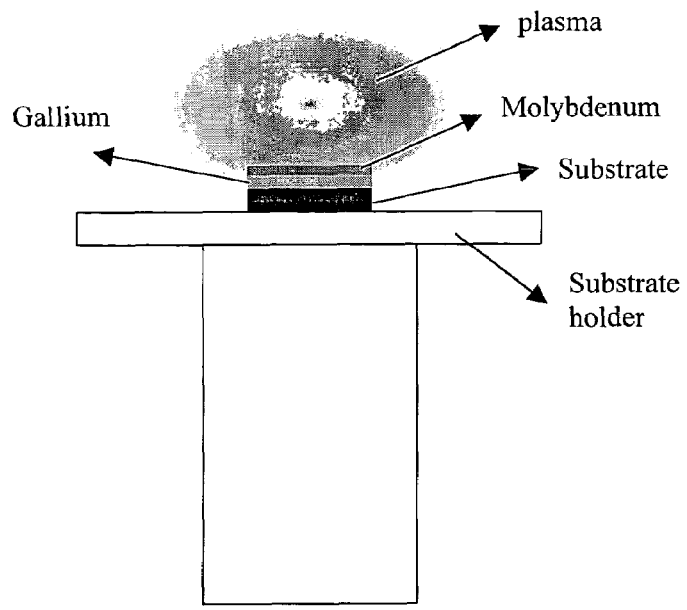
FIG. 15 shows a schematic of the experimental setup reactor.

A thin film of gallium is spread on a variety of substrates including, but no limited to, graphite, molybdenum and titanium. The next step is to sprinkle molybdenum powder (Alfa Aesar 99.99%) on the applied film of gallium. The molybdenum powder was purchased from Alfa Aesar (3-7 microns, 99.95% purity. The gallium was dusted with the molybdenum in a 1-15% molybdenum to gallium atomic ratio. The prepared substrate is then inserted into a Microwave Plasma reactor (ASTeX 5010) as best shown in FIG. 15. The experiments were started by first starting the hydrogen plasma followed by introducing the methane gas. The reactor chamber is pumped down to the base pressure of the reactor. Following this 100 sccm (Standard Cubic Centimeter) of hydrogen in introduced into the chamber and the pressure is maintained at 10-20 torr. At this pressure the plasma is generated by turning on the microwave power and increasing the microwave power to 500-600 watts. Once the plasma is "lit" the pressure is increased to 40 torr in a two step process from (1) 20-30 torr, (2) 30-40 torr, simultaneously increasing the microwave power to 1100 watts and maintaining at this power. The pressure of the reactor is maintained at 40 torr. Methane gas at 18 sccm flow rate is introduced at this stage. Thus, the setup was then exposed to 18% $CH_4/H_2$ plasma at 1100 watts Microwave power and 40 torr reactor pressure for one hour. After 1 hour of growth, the reactor is shut down by first turning off the methane gas supply. Then the microwave power and pressure are reduced to 400 watts and 10 torr, respectively, followed by turning off the hydrogen gas supply. The microwave power is then turned off and the reactor evacuated and allowed to cool down to ambient temperature.

The heating of the substrate is solely due to the plasma, with no independent substrate heating. The temperature of the substrate was measured to be 800-850° C. by an optical pyrometer. Experiments to synthesize conical structures were performed using $CH_4/H_2$ only. In other experiments to control the morphology, the feed gases were dosed with 5 sccm of O2 to 18 sccm of $CH_4$ and 100 sccm of $H_2$ at various stages of the growth process as required. For example, to synthesize 'Funnels', oxygen was introduced right from the start of the experiment for about 30 minutes followed by turning off the oxygen gas supply. No other parameters were changed. The described structures were not observed on the as synthesized samples. A layer of molybdenum-gallium alloy was observed as the topmost layer on the sample, which might have segregated during the shut down procedure. This could be avoided by temperature-controlled shut down, not possible with the reactor used. When the plasma is turned off, there is a sudden fluctuation in the temperature, as there is no substrate heating. This top layer was removed by gently tapping the sample, thus exposing the underneath carbon structures which are all over the substrate. The synthesized structures are analyzed using JEOL JSM 5310 scanning electron microscope operated at 25 kV and JEOL 2010F Transmission Electron Microscope operated at 200 kV. For TEM analysis the structures formed on the substrate were transferred onto a holey carbon grid.

Characterization

The synthesized nano-structures were analyzed using Scanning Electron Microscope (SEM), Transmission Electron Microscope (TEM) and Energy Dispersive Spectroscopy (EDS). The morphology of the structures were studied using SEM and TEM and the composition of the structures were studied by EDS attached to the SEM and TEM. Morphological studies using SEM and TEM suggested that the structures are hollow with gallium "droplet" at the tip. Some of the structures are partially filled with gallium along the length of the structures and some are completely hollow with no gallium inside. Different morphologies synthesized by controlling the feed gases composition during the growth (discussed later) were observed using SEM and TEM. The wall structure was analyzed using TEM Growth Mechanism A mechanism for the formation of varying conical angles of the carbon conical structures is described next. The presence of molybdenum promotes the nucleation of carbon at the gallium droplet-molybdenum interface and thus assists the formation of carbon 'tube' around the gallium droplet. As the carbon tube grows in length, the gallium-carbon interface (indicated in FIG. 1) lifts the gallium droplet by setting up a steady contact angle between the meniscus and the growing carbon wall, thus setting the tapering angle of the overall structure. During the initial stages of the growth process the system goes through certain unsteady state dynamics that gives rise to varying curvature at the base of the structures.

Figure 1:
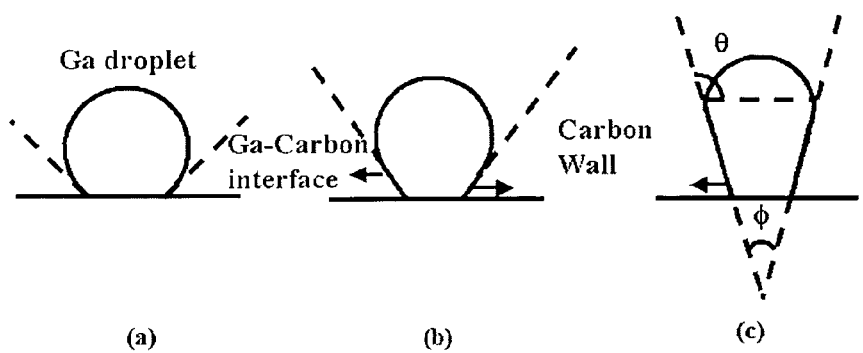
FIG. 1 are microphotographs showing a schematic of the growth mechanism. wherein (A) shows the initial gallium droplet; (B) shows the formation of carbon wall at the base of the gallium droplet whereby the wall forms tangential to the surface of the droplet and the addition of carbon occurs at the gallium carbon interface as shown; and (©) shows the geometric representation of the relation between the contact angle and the conical angle.

The meniscus angle and the conical angle of the resulting carbon tube are related by the following relationship:

$$\phi = 2\theta - 180° \quad \text{(eq 1)}$$

where θ is the contact angle between gallium and carbon and φ is the conical angle of the carbon structure where φ is the conical angle of the interface (carbon) structure, and θ is the contact angle between gallium and the developing interface (carbon) as shown in FIG. 1. Bando et al. showed that the contact angle of gallium inside carbon tube with temperature up to 550° C. varies from 93° to 113°. Any differences in the temperature or the gas phase composition would change the contact angle and thus the meniscus angle. The tapering angles (or conical angles) of all structures synthesized in the absence of oxygen and nitrogen in the gas phase were in the range of 7°-58°, corresponding to the estimated meniscus angles of 93°-119° during growth, respectively.

It is our hypothesis that the contact angle between gallium meniscus and the carbon wall is the factor controlling the conical angle and thus the morphology of the synthesized structure. Wetting behavior of gallium with carbon is enhanced in the presence of oxygen and nitrogen (lower contact angle) when compared to the behavior in the absence of oxygen of nitrogen (higher contact angle).

During plasma exposure of the gallium covered substrate, gallium film splits into gallium droplets. This initial step of gallium droplets formation is indicated in FIG. 1a. The presence of molybdenum promotes the precipitation of carbon onto the gallium droplets, forming a carbon wall around the gallium droplet. Once this wall is formed around the gallium droplets, further addition of carbon preferentially occurs at the gallium-carbon interface as shown in FIG. 1b. Note that the addition of carbon onto gallium droplet occurs in a way that the forming wall is always tangential to the surface of the gallium. During the growth, carbon is continuously available at the gallium-carbon interface. With constant addition of carbon at this interface, the interface advances in the growth direction, thus simultaneously pulling the gallium in the direction of growth. This is indicated in FIG. 1c. Once, a steady state is reached the tapering angle (conical angle) is determined by the meniscus shape (contact angle) of gallium. The contact angle of gallium with carbon could be changed either by changing the temperature or the gas phase chemistry or by both. Gas phase chemistries can be used to change the contact angle of gallium with carbon. In the presence of activated oxygen or nitrogen the contact angle of gallium with carbon reduces leading to a flatter Thus, by varying the contact angle during the growth; different morphologies can be synthesized in a predetermined fashion.

The wetting behavior of gallium with carbon can be altered using the gas phase. Similar amounts of oxygen and nitrogen have quantitatively different effect of the contact angle variations. Oxygen is more aggressive in changing the contact angle than nitrogen for similar amounts of dosing. In the presence of oxygen or nitrogen, gallium wets carbon more than it does in the absence of oxygen or nitrogen. Based on this, the next set of experiments was conducted by dosing the feed gases ($CH_4$ and $H_2$) with 5 sccm of oxygen. As per the hypothesis, these experiments resulted in straighter tubes with no or very small conical angles.

Controlling the Morphology

As previously described, the contact angle can be changed by either introducing oxygen of nitrogen in the feed gases. Here we describe the strategies required for controlled synthesis of various tubular morphologies. According to our growth mechanism, the contact angle of gallium with carbon determines the conical angle of the growing nano-structure. Therefore, controlling this contact angle using gas phase we can fine tune the internal diameters and morphologies.

The following different carbon morphologies can be synthesized by appropriate variations in the gas phase chemistry.

Cones

Figure 2:
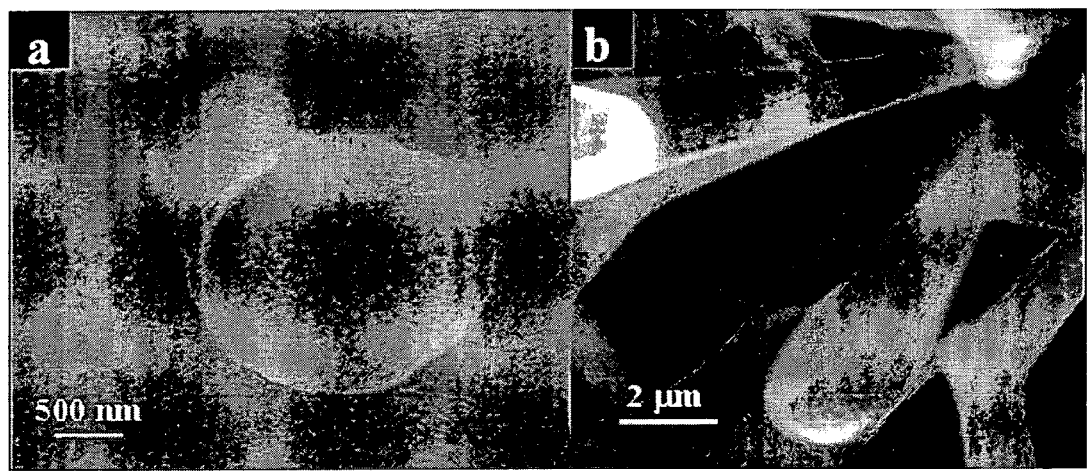
FIG. 2 shows scanning electron microscopy (SEM) images of hollow carbon nano-structures synthesized in the absence of oxygen with curved and tapered carbon tubular structures wherein (a) shows nozzles and (b) shows cones synthesized upon exposing the prepared substrate to 18% $CH_4/H_2$ plasma.

In the absence of oxygen and nitrogen gallium exhibits higher contact angles. In other words, gallium does not wet carbon. Therefore, the resulting morphology is a 'CONE'. The conical angles of cones, thus synthesized fall within the range of 15° to 25°. FIG. 2 illustrate the typical conical morphologies synthesized using this strategy (strategy 1). FIG. 2a shows a completely hollow cone with diameters as large as 2 microns at one end. On the other hand, FIG. 2b shows a cone partially filled with gallium. The bright regions within the cone correspond to gallium.

Tubes

Figure 3:
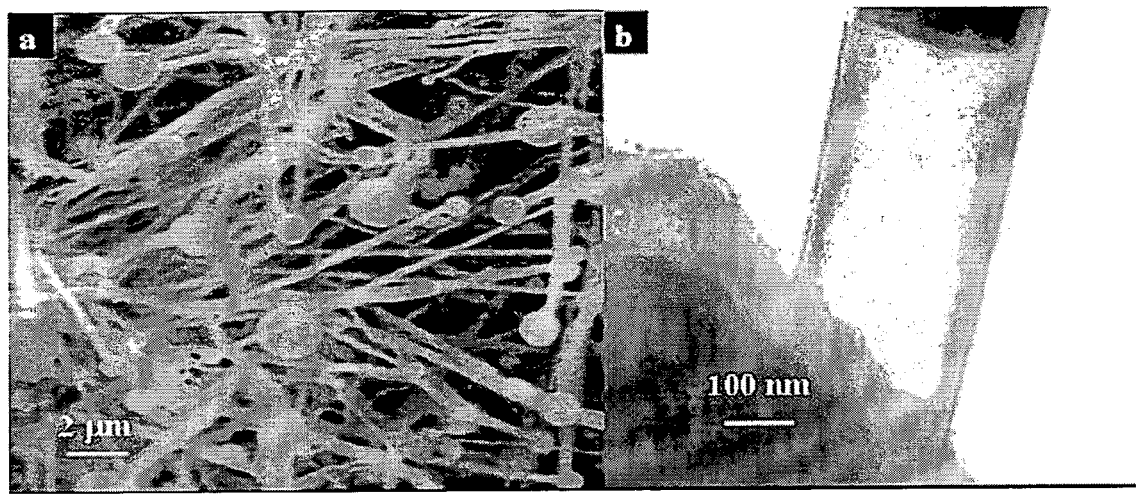
FIG. 3 are microphotographs showing straight carbon tubular structures synthesized by oxygen dozing through out the growth, whereby (A) is a scanning electron microscope (SEM) image; and (B) is a Transmission Electron Microscope (TEM) bright field image of the tubes synthesized.

Straight tubular structures were synthesized by dosing the feed gases with oxygen. 5 sccm of Oxygen was dosed into $CH_4/H_2$ feed gases at the conditions described in the procedure. Upon addition of oxygen the contact angle of gallium with carbon is reduced and thus reducing the conical angle to near zero. Employing this strategy (strategy 2) of oxygen dosing, we synthesized straight tubes with zero or extremely small conical angles as illustrated in FIG. 3.

Cone-Tube or Tube-on-Cone

Figure 4:
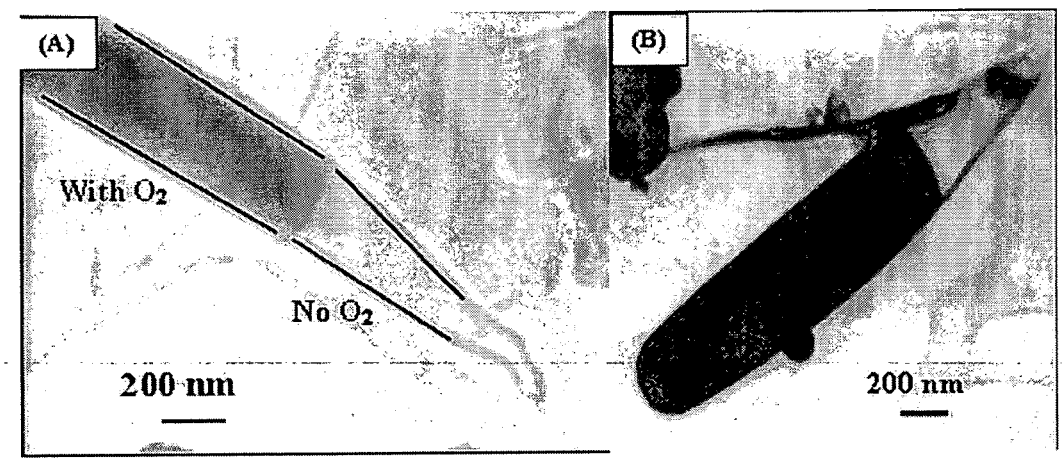
FIG. 4 shows TEM micrographs of Cone-Tube morphology synthesized by introducing oxygen after 30 minutes of the growth.

Employing a combination of strategy 1 and strategy 2 structures with cone-tube morphology were synthesized. During the first half of the growth strategy 1 was employed, where only $CH_4/H_2$ were used in the feed gases. This results in the conical morphology. During the rest of the growth strategy 2 is employed. In this step 5 sccm of Oxygen is dosed to the feed gases. Addition of oxygen reduces the contact angle and therefore, the cone that was formed in the first step now grows as tube. This results in a Cone-Tube morphology or Tube-on-Cone morphology. TEM analysis of these structures clearly showed a sharp transition from cone to tube morphology on the same tubular structure. This is shown in FIG. 4. The sequence employed for synthesizing Tube-on-cone is: Strategy 1-Strategy 2.

Tube-Cone or Cone-n-Tube (Funnels)

Figure 5:
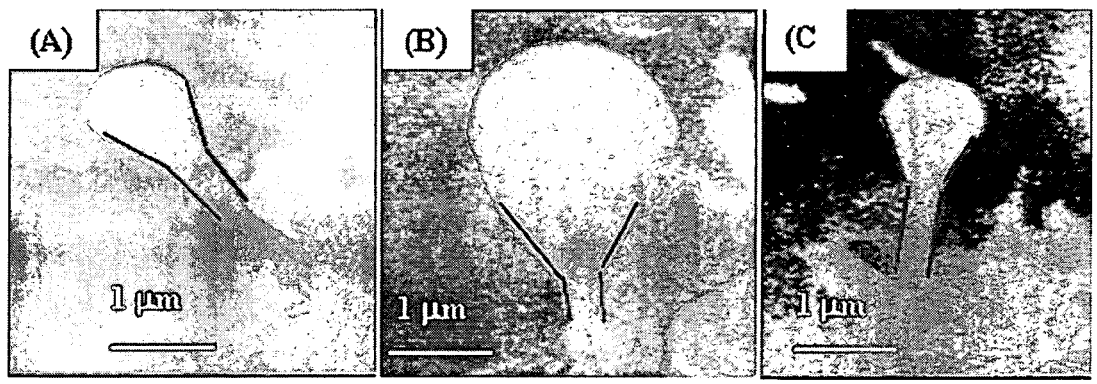
FIG. 5 shows SEM micrographs of funnels (Tube-cone morphologies).

Employing strategy 2 in the first half of the growth and strategy 2 in the latter part of the growth we could synthesize Funnel morphologies as shown in FIG. 5. The sequence employed for Funnel morphologies is Strategy 2-Strategy 1.

Cone-Tube-Cone

Figure 6:
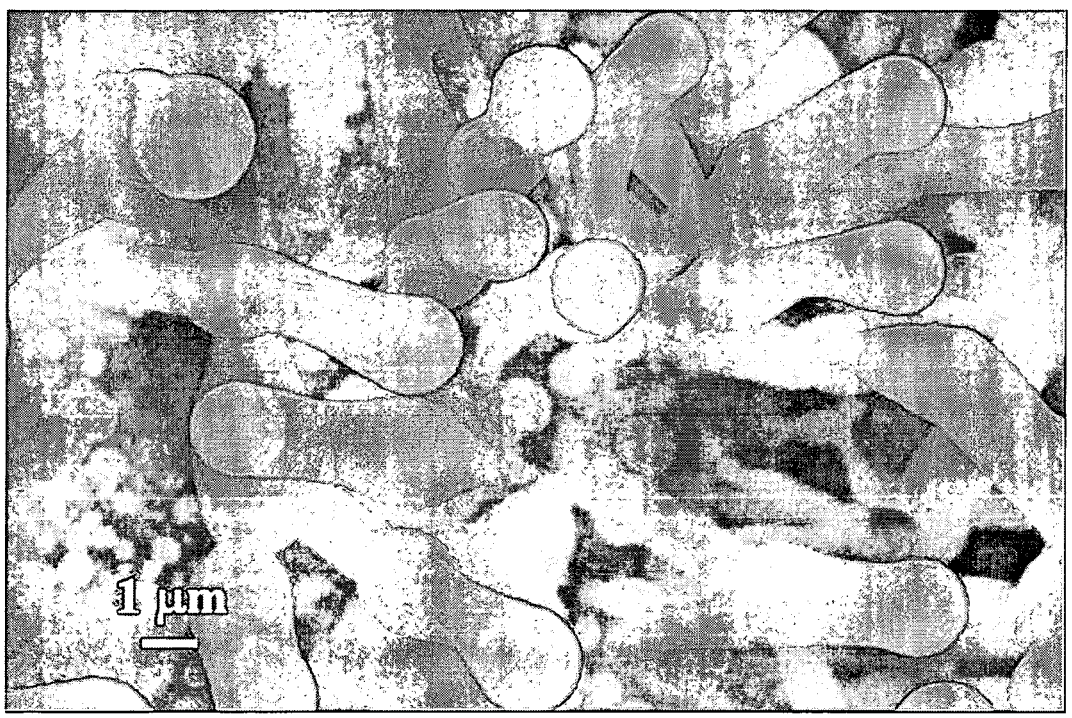
FIG. 6 shows SEM micrographs of cone-tube-cone morphologies synthesized by intermittent dosing with $O_2$.

The structures shown in FIG. 6 were synthesized by intermediate dosing with oxygen. The sequence employed for these morphologies is: Strategy 1-Strategy 2-Strategy 1. In the first step of the sequence no oxygen was introduced, in the second step oxygen was introduced for a brief period. In the final step oxygen was turned off. The duration of each step could be chosen so as to control the length of each segment of the morphology being formed.

N-staged Structures

Figure 7:
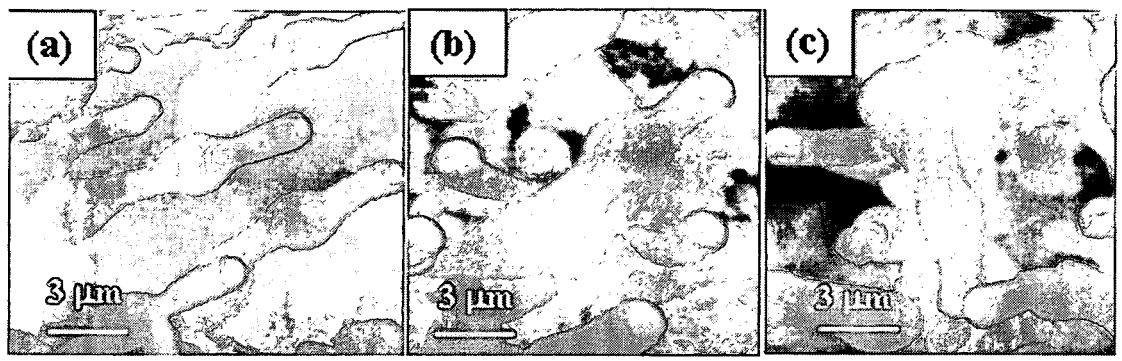
FIG. 7 shows SEM micrographs of multi-junctioned tubular structures synthesized by six step sequence experiment.

Employing 'n' different dosing steps during growth we could synthesized 'n-staged' morphology. One such 6-staged morphology is shown in FIG. 7. The sequence adopted for such morphology is: Strategy 2-Strategy 1-Strategy 2-Strategy 1-Strategy 2-Strategy 1. Any such combinations of strategies could be used to created multi-staged morphologies in a predetermined fashion. The length of each segment of the morphology can be controlled appropriately timing the oxygen dosing.

Pinched Morphologies

As mentioned earlier, oxygen and nitrogen have similar effect on the wetting behavior of gallium with carbon. However, for the same dosing compositions of oxygen and nitrogen the reduction in contact of gallium is larger for oxygen than for nitrogen. By using increasing amounts of nitrogen dosing we can change the contact angle continuously. In the conditions required for this process the formation of gallium nitride is inhibited by the presence of hydrogen in the gas phase. However, increasing the amount of oxygen dosing (more than 5 sccm) results in the formation of gallium oxide nanostructures. One can utilize nitrogen to tune the conical angles of carbon tubes. Higher amounts of nitrogen dosing can be used to create pinched carbon morphologies.

Figure 8:
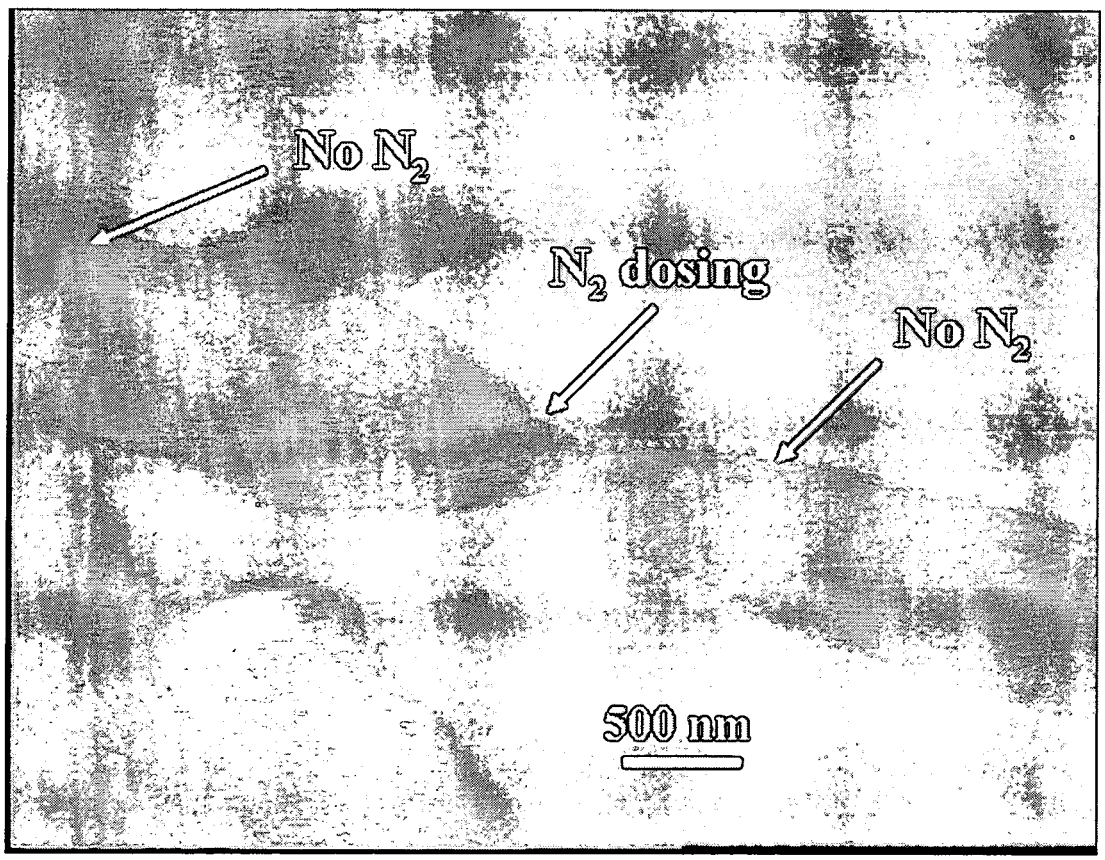
FIG. 8 shows SEM micrographs of dumbbell morphologies.

The strategy for creating pinched morphologies involved three steps. During the first step strategy 1' is adopted. This leads to the formation of a conical morphology. The next step is dosing the feed gases with higher amounts of nitrogen in the gas phase (Strategy 3). In the rest of the text the strategy of dosing the feed gases with nitrogen will be referred to as strategy 3. As will be discussed in the next section, using high amounts of nitrogen will cause the tube to grow in a manner opposite to cone growth using strategy 1. The diameter of the cone decreases with further growth, upon dosing with higher amounts of nitrogen. During this second step the cone growth proceeds such that the diameter is reduced with growth. The next step in the strategy is to turn the nitrogen dosing off. As soon as the nitrogen dosing is turned off growth proceeds such that the cone growth described in strategy 1 resumes. Therefore we can create carbon tubular morphologies that appear to be pinched in the middle. This is clearly shown in FIG. 8. The sequence for creating pinched morphologies is: Strategy 1-Strategy 2-Strategy 1.

Capsules

Figure 9:
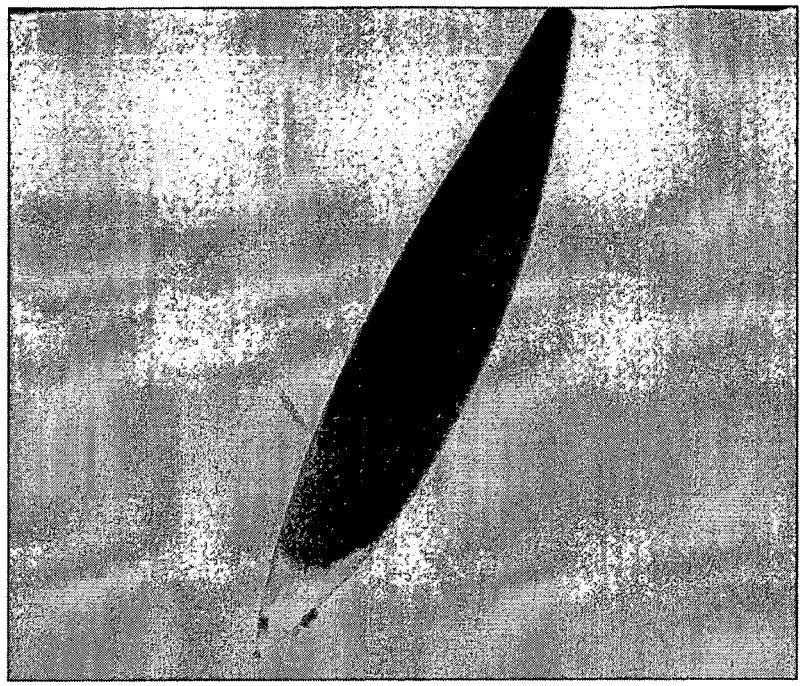
FIG. 9 show TEM micrograph of capsule morphologies

Morphologies similar to capsules were synthesized by adopting the sequence Strategy 1-Strategy 3. During the first stage of the growth the resulting morphology is a cone and upon dosing the feed gases with higher amounts of $N_2$ (30 sccm) the cone grows in the opposite sense, i.e. the diameters decreases with growth. Due to the continuous decrease in diameter, after a certain period of time the carbon wall completely covers the gallium thus closing at one end of the structure. This is illustrated in FIG. 9.

Y-Junctions

Figure 10:
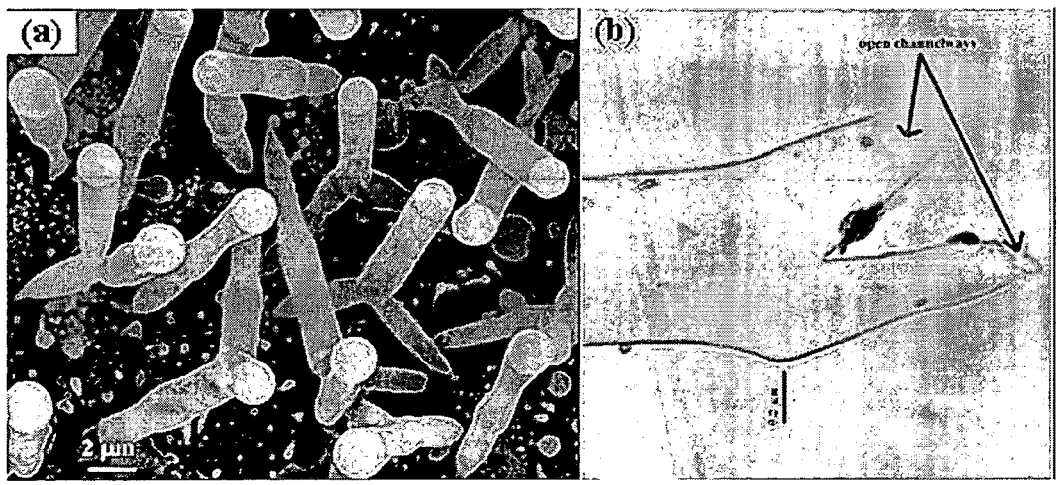
FIG. 10 shows SEM and TEM micrographs of Y-junctions. The open channels are clearly illustrated in (b).

The physical impingement of two or more growing carbon structures with gallium at the tips would result in spontaneous coalescence of gallium droplets into one bigger droplet, due to strong cohesive forces associated with gallium. This type of coalescence, upon further growth, leads to the formation of seamless Y-junctions, as shown in FIG. 10(*a-b*). Theoretically, Y-junctions within carbon nanotubes were predicted to possess useful electronic junction properties. Experimentally, till now, carbon tubular structures with Y-junctions were synthesized either by using a porous template for splitting the carbon nanostructure during growth, or by branching during growth via pyrolysis. The results presented in FIG. 10 illustrate that one can coalesce two or more independently growing tubes into one bigger tube during growth reliably. FIG. 10(*b*) furthermore indicates that even after two carbon tubular structures combine into a single tube, the entire channel way remains open.

Similar wall thickness of the stem and the branches was observed. This is shown in FIG. 10. Also evident from the figure are the open channels comprising the Y-junction with no internal obstructions, as indicated by the TEM investigation. Also, the inner diameter of the bigger tube after junction is found to be equivalent to the diameter based on the volume generated from the two coalesced gallium droplets. These results further confirm the spontaneous coalescence of gallium droplets at tips of individual carbon tubular structures upon impingement while continuing growth in a normal fashion after coalescence. In addition, similar wall thickness is maintained even after coalescence. The size and openness of the channels make these multi-channeled carbon tubular structures promising for various micro-fluidic, micro-reactor and electronic applications.

Tuning the Conical Angles

Figure 11:
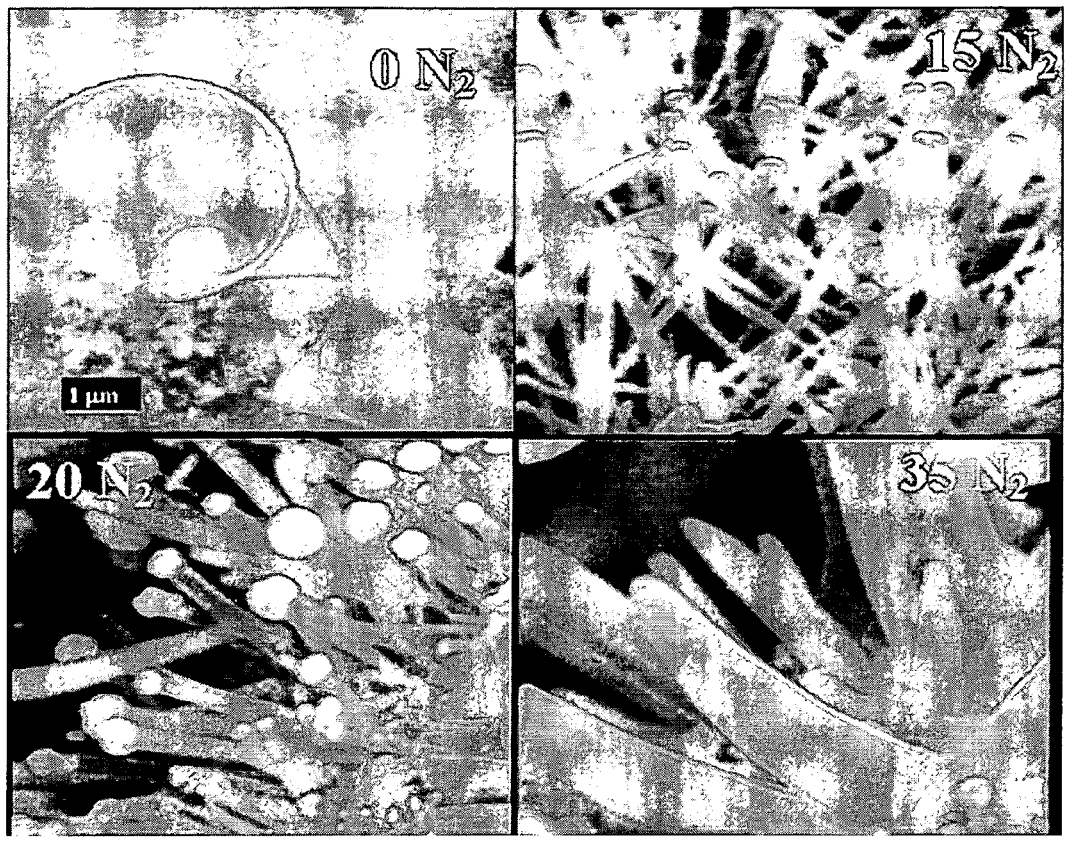
FIG. 11 shows SEM micrographs of conical structures with control over the conical angles using different $N_2$ dosings.

The conical angles of the carbon tubular morphologies can be tuned and controlled using variations in the dosing of oxygen and nitrogen. As set forth heretofore, oxygen and nitrogen have qualitatively similar effect, but quantitatively different effect on the wetting behavior of gallium with carbon. In typical experiment using 5 sccm of oxygen causes the growth to be almost straight tube as described earlier. With no oxygen or nitrogen dosing the morphologies formed are 'cones' with conical angles in the range of 20°±5°. Using oxygen dosing (Strategy 2) these conical angles are now reduced to ≈0°. On the other hand using only 5 sccm of nitrogen dosing does not cause appreciable change in the contact angle. However, increasing the dosing of nitrogen to the feed gases we could continuously reduce the conical angles. At nitrogen dosing of about 10-15 sccm the conical angles are within 5°. Using even higher nitrogen doses, the conical angles can be reduced below 0°. This implies that instead of increase in the diameter of the cone with growth the diameter of the cone decreases with growth with nitrogen doses beyond 20 sccm. FIG. 11 illustrates the control over the conical angles with different nitrogen doses.

Tuning the Internal Diameters

Figure 12:
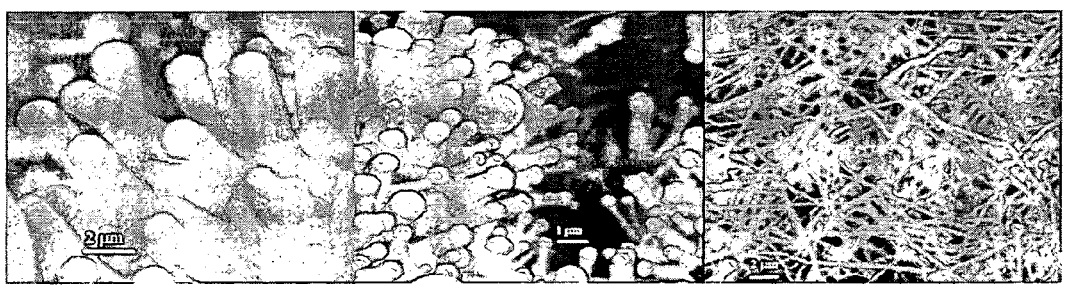
FIG. 12 shows SEM micrographs of carbon tubular structures illustrating the control over diameters.
Figure 13:
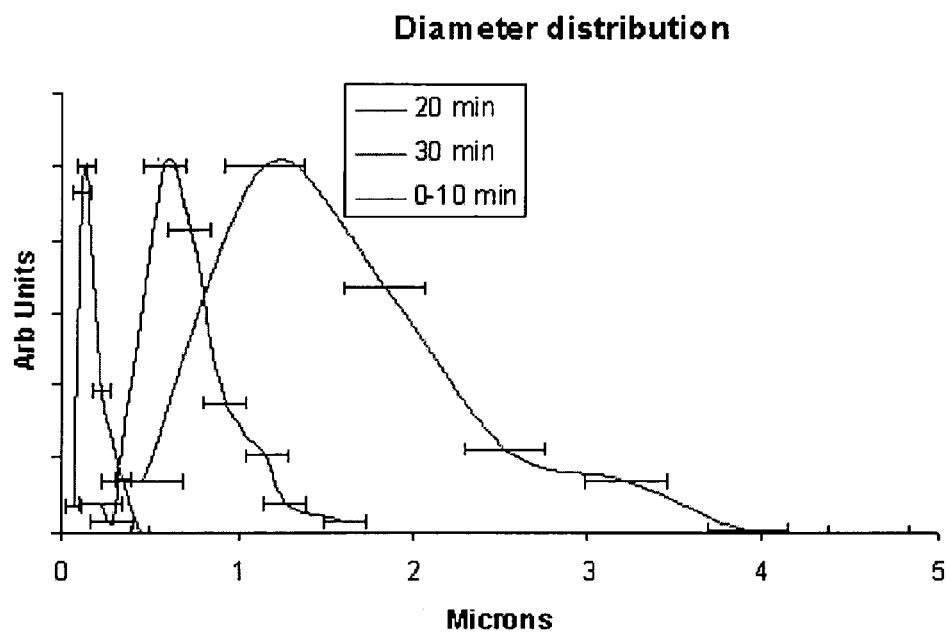
FIG. 13 shows the diameter distribution obtained using intermittent oxygen dosing.

By appropriately timing the oxygen dosing during the growth we could successfully control the internal diameters of the carbon tubes. As mentioned earlier, using oxygen dosing during the second half of the growth, we could synthesize 'tube-on-cone' morphologies. By dosing oxygen 0-10 min, 20 min and 30 min after the start of the experiment we could increase the diameters of the carbon tubes from 150 nm to about 1.5 microns. The diameter distribution of the carbon tubes obtained in these experiments is shown in FIG. 12 and FIG. 13. The total time for each experiment lasted one hour.

The principle involved in this method is that as the cone is growing the diameter of the cone increases with time. Therefore, by appropriately introducing oxygen at different times during the growth, we can tune the diameter of the tube that grows after the oxygen dosing. The diameter of such tubes can be increased to values as high as 25 microns, provided there is enough gallium to sustain the growth. In our experiments the amount of gallium required for such large diameters is limited due to the use of thin film of gallium. This limitation can, however, be overcome by constantly supplying gallium through the gas phase by using gallium precursors such as tri-methyl gallium.

Wall Structure

Figure 14:
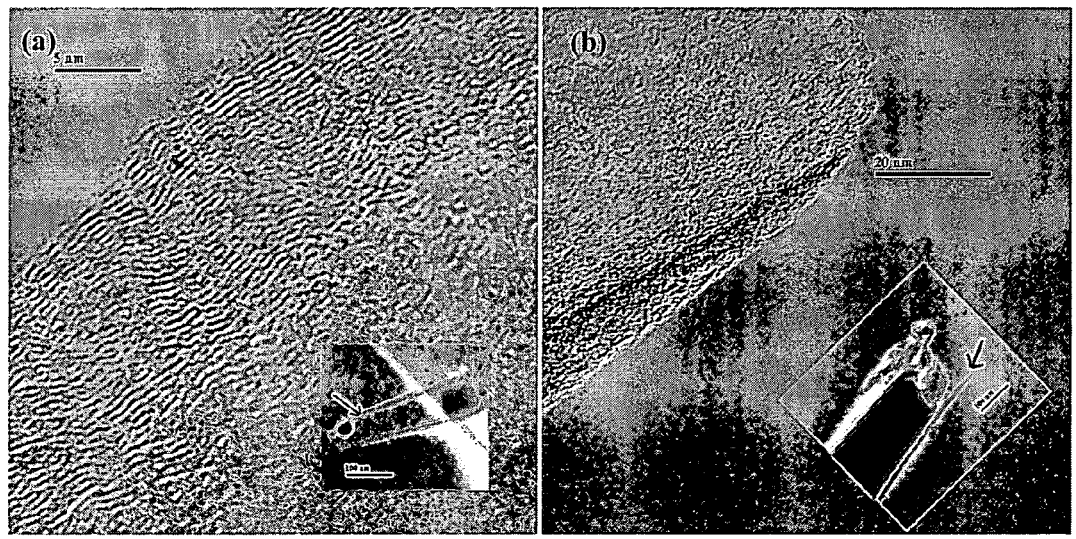
FIG. 14 shows TEM micrographs illustrating the wall structure of the carbon tubes.

The carbon wall structure of all the synthesized structures (tube wall) is shown to be multi-walled and crystalline as illustrated in the HRTEM (image in FIG. 14(*a*). The structures maintain a constant wall thickness throughout their length except at the tip. The wall thickness tapers only near the tip or the growth interface (FIG. 14(*b*)). This tapering of wall thickness at the growing tip is observed in almost all the samples examined using HRTEM. These results indicate that the wall is indeed growing tangential to the gallium meniscus, confirming the growth mechanism.

The wall structure of the carbon tubes was investigated using dark field STEM (Scanning Transmission Electron Microscopy). Based on the analysis we determined that the wall is comprised of parallel sets of nanocrystals of graphite in the size ranging from 2 nm to 5 nm. These parallel sets of graphite nanocrystals (GNC's) have a specific orientation with respect to the wall surface depending on the kind of morphology.

The foregoing detailed description is given primarily for clearness of understanding and no unnecessary limitations are to be understood therefrom, for modification will become obvious to those skilled in the art upon reading this disclosure and may be made upon departing from the spirit of the invention and scope of the appended claims. Accordingly, this invention is not intended to be limited by the specific exemplifications presented hereinabove. Rather, what is intended to be covered is within the spirit and scope of the appended claims.

1. The present invention comprises a technique to synthesize and control the (a) internal diameters (b) conical angles and ©) morphology of tubular carbon nano/micro structures. Using this technique different morphologies can be synthesized: Cones, Straight Tubes, Cone-on-tube (funnels), Tube-in-Cone, Cone-tube cone, n-staged structures, y-junctions, Dumbbell (pinched, morphology) and Capsules.
2. The technique is based on changing the wetting behavior of low melting metals such as gallium, indium, and aluminum with carbon using different gas phase chemistries.
3. The described carbon tubular morphologies can be synthesized using any kind of gas phase excitation such as, but not limited to, microwave excitation, hot filament excitation, thermal excitation and Radio Frequency (RF) excitations.
4. The depositions area is only limited by the substrate area in the equipment used and not limited by the process.
5. The internal diameters of the carbon tubular structures can be varied from a few nm to almost as high as 20 microns. The wall thickness is about 10-20 nm.
6. The carbon tubular structures are open on both ends directly applicable to micro-fluidics.
7. Gallium required for the growth of the carbon tubes can be supplied either as a thin film on the substrate or could be supplied through the gas phase with different precursors such as Tri-methyl gallium.
8. Seamless Y-junctions with no internal obstructions can be synthesized without the need of templates.
9. Multi-channeled junctions can also be synthesized without any internal obstructions.
10. Gallium that partially fills the carbon structures can be removed from the tubes by simple heating in vacuum at temperature 600° C. or above.
11. Any gas phase dosing that cause variations in the wetting behavior of low melting metals can be used to control the morphologies just as oxygen or nitrogen.
12. Any kind of carbon source for the growth of carbon tubes could be used, although we illustrated the growth of carbon tube using methane.
13. In this invention we described the controlled synthesis of carbon tubes. However, this growth concept can be extended to synthesize tubular morphologies of other material systems.

The invention claimed is:

1. A method of synthesizing and controlling the morphology of tubular nanostructures by controlling the wetting behavior of a low melting metal and a nonreactive substrate in different gas phase growth environments, comprising the steps of:
   selecting said low melting metal from the group consisting of gallium, indium, and aluminum;
   selecting said nonreactive substrate from the group consisting of carbon, silicon, graphite, molybdenum, titanium and combinations thereof;
   depositing said low melting metal in a thin film on said nonreactive substrate;
   dusting said low melting metal with molybdenum powder to form a prepared substrate;
   inserting said prepared substrate into a reactor;
   introducing hydrogen gas into said reactor;
   subjecting said prepared substrate and said hydrogen gas to means for producing a gas phase excitation, thereby forming a hydrogen plasma at a first selected pressure, at a first selected temperature, and for a first selected period of time, wherein low melting metal droplets are formed on said nonreactive substrate in said hydrogen plasma;
   injecting at least one feed gas selected from the group consisting of oxygen, methane, nitrogen, hydrogen, and combinations thereof into said reactor in at least one dose for exposing said prepared substrate to said feed gas and said hydrogen plasma at a second selected pressure, at a second selected temperature, and for a second selected period of time for defining a growth stage of a tubular nanostructure, wherein carbon precipitates onto said low melting metal droplets, thereby forming a carbon wall around at least one of said low melting metal droplets, said carbon wall forming and growing tangentially to a surface of said at least one of said low melting metal droplets;
   controlling the feed gas composition during said growth stage, thereby growing and controlling the morphology of said tubular nano structure;
   turning off said feed gas and said hydrogen gas;
   removing said tubular nanostructure from said reactor; and
   heating said tubular nanostructure to remove said low melting metal therefrom.

2. The method of claim 1, including the step of controlling a contact angle between at least one of said low melting metal droplets and said carbon wall.

3. The method of claim 1, including the step of varying said meniscus shape during said growth shape by controlling the temperature during said growth stage allowing for tapering and/or curving of a growing tubular nanostructure.

4. The method of claim 1, including the step of closing said tubular nanostructure with a selected gas during said growth stage thereby wetting said nonreactive substrate with said low melting metal and reducing the contact angle, thereby flattening the droplet during said growth phase.

5. The method of claim 4, wherein said selected gas comprises methane.

6. The method of claim 1, wherein said low melting metal is gallium.

7. The method of claim 1, wherein said nonreactive substrate comprises carbon.

8. The method of claim 1, including the step of growing tubular nanostructures in the absence of oxygen or nitrogen to prohibit wetting of said nonreactive substrate with said low melting metal, thereby increasing the contact angle during said growth phase.

9. The method of claim 1, wherein said means for producing a gas phase excitation is selected from the group consisting of microwave excitation, hot filament excitation, thermal excitation, Radio Frequency (RF) excitations, and combinations thereof.

10. The method of claim 1, wherein said depositing said low melting metal on said nonreactive substrate in a thin film comprises the step of depositing a gaseous low melting metal precursor to form said low melting metal.

11. The method of claim 10, wherein said precursor is tri-methyl gallium.

12. The method of claim 1, further comprising the step of exposing said prepared substrate to different gas phase chemistry and/or temperature changes during said growth stage, thereby changing the wetting behavior of said low melting metals and said nonreactive substrates, thereby creating different morphologies of tubular nanostructures consisting of curved tubes, cones, nozzles, funnels, multijunctioned tubes, straight tubes, nozzles, cone-on-tube (funnels), tube-on-cone, cone-tube-cone, n-staged structures, Y-junctions, dumbbell (pinched morphology) tubes, capsules, and combinations thereof.

13. The method of claim 1, further comprising the step of controlling the wall thickness of portions of a said tubular nanostructure.

14. The method of claim 1, further comprising the step of altering the shape of a portion of said tubular nanostructures in said growth stage in-situ by changing a gas phase chemistry and/or a temperature.

15. The method of claim 1, wherein said tubular nanostructures comprise internal diameters ranging up to 20 microns.

16. The method of claim 1, wherein said tubular nanostructures comprise a wall thickness of up to 30 nanometers.

17. The method of claim 1, including the step of removing any residual portion of said low melting metal partially filling said tubular nanostructure heating in vacuum at a temperature of from at least 600° C.

18. The method of claim 1, including the step of growing tubular nanostructures in the presence of oxygen or nitrogen to wet said nonreactive substrate with said low melting metal, thereby forming substantially straight said tubular nanostructures.

19. The method of claim 1, including the step of growing said carbon wall in length by setting up a steady contact angle.

20. The method of claim 2, wherein the step of controlling the contact angle comprises using variations in the dosing of oxygen and nitrogen.

* * * * *

UNITED STATES PATENT AND TRADEMARK OFFICE
CERTIFICATE OF CORRECTION

PATENT NO. : 7,597,941 B2
APPLICATION NO. : 10/937738
DATED : October 6, 2009
INVENTOR(S) : Sunkara et al.

Page 1 of 1

It is certified that error appears in the above-identified patent and that said Letters Patent is hereby corrected as shown below:

IN THE SPECIFICATION:

Col. 11, line 25: Delete "©" and replace with "c"

IN THE CLAIMS:

Claim 1, col. 12, line 39: Delete "nano structure" and replace with "nanostructure"

Claim 3, col. 12, line 48: Delete "growth shape" and replace with "growth stage"

Claim 4, col. 12, line 55: Delete "phase" and replace with "stage"

Claim 8, col. 12, line 66: Delete "phase" and replace with "stage"

Signed and Sealed this

Fifteenth Day of December, 2009

David J. Kappos
*Director of the United States Patent and Trademark Office*